United States Patent
Thenier et al.

(10) Patent No.: US 7,934,587 B2
(45) Date of Patent: May 3, 2011

(54) INJECTION MOULDED PART, ENERGY ABSORBING ASSEMBLY WITH SPACER, AND METHOD FOR MAKING SUCH AN ASSEMBLY

(75) Inventors: Hervé Thenier, Courbevoie (FR); Nathalie David, Saint-Ouen-L'Aumone (FR); Stéphane Baxiu, Méru (FR)

(73) Assignee: Faurecia Interieur Industrie, Nanterre (FR)

( * ) Notice: Subject to any disclaimer, the term of this patent is extended or adjusted under 35 U.S.C. 154(b) by 748 days.

(21) Appl. No.: 11/883,838

(22) PCT Filed: Mar. 9, 2006

(86) PCT No.: PCT/FR2006/000522
§ 371 (c)(1),
(2), (4) Date: Aug. 7, 2007

(87) PCT Pub. No.: WO2006/100362
PCT Pub. Date: Sep. 28, 2006

(65) Prior Publication Data
US 2008/0157564 A1    Jul. 3, 2008

(30) Foreign Application Priority Data
Mar. 21, 2005    (FR) .................................... 05 02781

(51) Int. Cl.
*F16F 7/12* (2006.01)
(52) U.S. Cl. ..................... 188/371; 188/377; 296/146.6; 296/187.03
(58) Field of Classification Search ................. 188/371, 188/372, 376, 377; 267/139; 296/146.6, 296/146.7, 146.1, 146.5, 187.02, 187.03
See application file for complete search history.

(56) References Cited

U.S. PATENT DOCUMENTS

| | | | |
|---|---|---|---|
| 4,890,877 A | | 1/1990 | Ashtiani-Zarandi et al. |
| 5,833,303 A | * | 11/1998 | Kawai et al. ............. 296/187.05 |
| 6,059,342 A | * | 5/2000 | Kawai et al. .................. 296/39.1 |
| 6,302,477 B1 | * | 10/2001 | Satou ........................ 296/187.05 |
| 6,543,838 B1 | | 4/2003 | Bertolini et al. |
| 6,550,850 B2 | | 4/2003 | Laborie et al. |
| 6,592,143 B2 | * | 7/2003 | Takahashi et al. .......... 280/730.2 |
| 6,682,128 B2 | * | 1/2004 | Carroll et al. ............. 296/187.03 |
| 7,625,036 B2 | * | 12/2009 | Cormier et al. ........... 296/187.03 |
| 2002/0145298 A1 | | 10/2002 | Williams et al. |
| 2004/0124572 A1 | | 7/2004 | Tamada et al. |
| 2004/0178662 A1 | | 9/2004 | Carroll, III et al. |
| 2005/0161982 A1 | * | 7/2005 | Cormier et al. ................ 296/214 |

FOREIGN PATENT DOCUMENTS

FR    2 758 115 A    7/1998
FR    2 185 100 A    4/2002

* cited by examiner

*Primary Examiner* — Robert A Siconolfi
*Assistant Examiner* — Mariano Sy
(74) *Attorney, Agent, or Firm* — Young & Thompson

(57) ABSTRACT

An injected part (26) designed to form by being folded, an energy absorbing device and a spacer, the energy absorbing device having a number of hollow elements (12) projecting from a first plate portion (10), and a number of hollow elements (16) projecting from a second plate portion (14), associated in pairs. The spacer includes a number of spacing elements (20) projecting from a third plate portion (18), one of the plate portions (10, 14, 18) is articulated on the other two, and the articulations (28, 30) are such that, after each of the plates has rotated by 180°, a first hollow element (12), a second hollow element (16) and a spacer element (20) are aligned. The energy absorbing device is designed to motor vehicle doors.

17 Claims, 2 Drawing Sheets

INJECTION MOULDED PART, ENERGY ABSORBING ASSEMBLY WITH SPACER, AND METHOD FOR MAKING SUCH AN ASSEMBLY

The invention relates to an injection-moulded part which, by being folded, is to form an energy-absorbing device and a spacer, to an energy-absorbing assembly with a spacer, and to a method for producing such an assembly.

BACKGROUND OF THE INVENTION

Impact-absorbing elements are conventionally used in motor vehicle doors, which elements are placed between the inside door panel and a location adjacent to the passage for the window so that, in the case of a lateral impact, the occupant next to the door is subjected to only a weak impact. Furthermore, such energy-absorbing devices are so arranged that, in the case of a sufficiently great impact, the impact is transmitted to the occupant's pelvis rather than to another part of his body.

Absorbing devices have already been produced in which hollow impact-absorbing elements of generally conical shape project from a plate portion, as described in document FR-2 784 151.

However, given the considerable space that must be occupied by the energy-absorbing device, it became clear that the configuration of each hollow impact-absorbing element was not optimal, and that it was desirable to reduce the height thereof.

There were therefore produced, as described in document FR-2 815 100, energy-absorbing devices in which hollow impact-absorbing elements of reduced height are formed on two plate portions which are brought into contact so that two impact-absorbing elements are aligned in the trans-verse direction. The relative positions of the impact-absorbing elements and their particular characteristics can be adapted so that each impact-absorbing element has a configuration well suited to the impacts that are to be absorbed.

Such energy-absorbing devices having stacked hollow impact-absorbing elements are at present used in motor vehicle doors; during assembly, they are generally associated with spacers for adaptation to the width which must be occupied by the absorbing device between the inside door panel and the passage for the window associated with the door.

Accordingly, the manufacture of the elements that are ultimately fitted into the motor vehicle doors requires on the one hand the manufacture of an energy-absorbing device having hollow impact-absorbing elements, and on the other hand the manufacture of spacers, the spacers being fitted to the absorbing elements during manufacture of the motor vehicles.

SUMMARY OF THE INVENTION

The object of the invention is to simplify the manufacture of motor vehicles by producing a sub-assembly comprising both the impact-absorbing device and the spacers, thus avoiding a fitting operation on the assembly line.

To that end, the invention relates to an injection-moulded part which comprises both all the hollow impact-absorbing elements of the energy-absorbing device, and the associated spacers. In that manner, the assembly can be produced at reduced cost, and it allows assembly of the motor vehicles to be simplified.

More precisely, the invention relates to an injection-moulded part which, by being folded, is to form an energy-absorbing device and a spacer, the energy-absorbing device having a plurality of hollow impact-absorbing elements projecting from a first plate portion and a plurality of hollow impact-absorbing elements projecting from a second plate portion, the absorbing elements of the two plates being associated in pairs; according to the invention, the spacer comprises a plurality of spacer elements projecting from a third plate portion, one of the first, second and third plate portions being articulated with the other two, the articulations being so arranged that, after each of the plate portions has been rotated through 180°, a hollow impact-absorbing element of the first plate portion, a hollow impact-absorbing element of the second plate portion and a spacer element are aligned in a direction perpendicular to the plane of the plate portions.

The bottom of the hollow impact-absorbing element, facing the corresponding plate portion, carries a first fixing device selected from a shaft and a hole, and the spacer element carries a second fixing device which is selected from a hole and a shaft, respectively, and is intended to cooperate with the fixing device of the adjacent hollow impact-absorbing element.

The hollow impact-absorbing elements projecting from the first plate portion have a shape that is elongated in a direction parallel to the plane of the first plate portion, the hollow impact-absorbing elements projecting from the second plate portion have a shape that is elongated in a direction parallel to the plane of the second plate portion, and, when the first and second plate portions are side by side in the principal plane of the injection-moulded part, the directions of elongation of a hollow impact-absorbing element of the first plate portion and of the hollow impact-absorbing element that is to come to face it are very close or are coincident so that, after the plate portions have been rotated through 180° to form the energy-absorbing device, the directions of elongation are very different.

Prior to folding, the directions of elongation of two hollow elements that are to cooperate are preferably the same or only slightly different so that, after the plate portions have been rotated through 180° to form the energy-absorbing device, the directions of elongation are substantially perpendicular.

Each spacer element preferably comprises a plurality of intersecting ribs, the direction of elongation of the ribs being perpendicular to the direction of the plate portions.

The invention relates also to an energy-absorbing assembly with a spacer, which assembly is formed from an injection-moulded part according to the preceding paragraphs, in such a manner that each spacer element is pressed against the bottom of the adjacent hollow impact-absorbing element, the bottom being on the side facing the corresponding plate portion, and the spacer element is fixed to the bottom.

The two plate portions carrying the hollow impact-absorbing elements are preferably in contact.

The invention relates also to a method for producing an energy-absorbing device for a motor vehicle door by using parts according to the preceding paragraphs, which method comprises a first operation of folding the plate portion carrying the spacer elements towards the plate portion carrying the hollow energy-absorbing elements that are to be adjacent to the spacer elements, an operation of fixing the spacer elements to the adjacent hollow impact-absorbing elements, and then an operation of rotating the other plate portion carrying the other hollow impact-absorbing elements.

Fixing of the spacer elements to the hollow impact-absorbing elements is preferably effected by forming a head for fixing the hollow shock-absorbing element to the spacer element.

BRIEF DESCRIPTION OF THE DRAWINGS

Other features and advantages of the invention will be better understood upon reading the following description of exemplary embodiments, which makes reference to the accompanying drawings, in which.

DETAILED DESCRIPTION OF THE PREFERRED EMBODIMENTS

Figure 2:
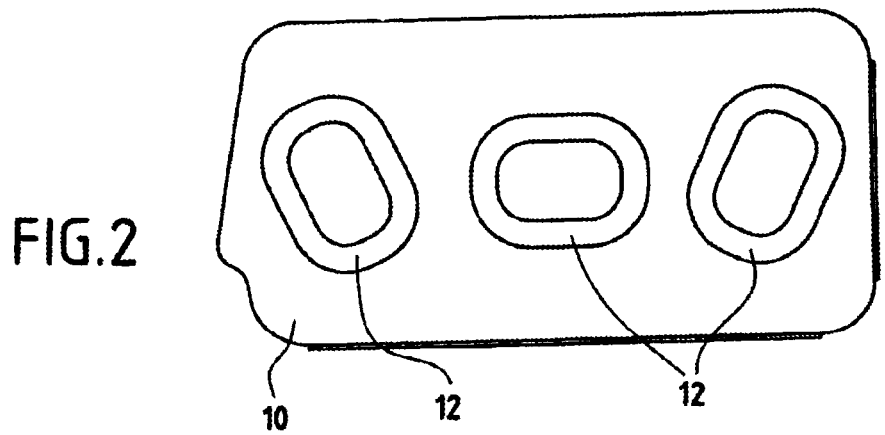
FIG. 2 is a side view of an impact-energy-absorbing assembly with a spacer obtained using the injection-moulded part according to the invention.

A first plate portion 10 carries impact-absorbing elements 12 turned towards the side that is to be located towards the inside of a motor vehicle. A second plate portion 14 carrying hollow impact-absorbing elements 16 is pressed against the first plate portion 10, the two absorbing elements 12 and 16 forming an energy-absorbing device. The hollow energy-absorbing elements 12 preferably have an elongated shape, which is shown in FIG. 2. Likewise, the hollow elements 16 have an elongated shape, having a direction perpendicular to the direction of elongation of the first absorbing elements 12. Absorbing devices formed by the two plate portions 10, 14 and the hollow impact-absorbing elements 12, 16 are already known and in use.

Figure 1:
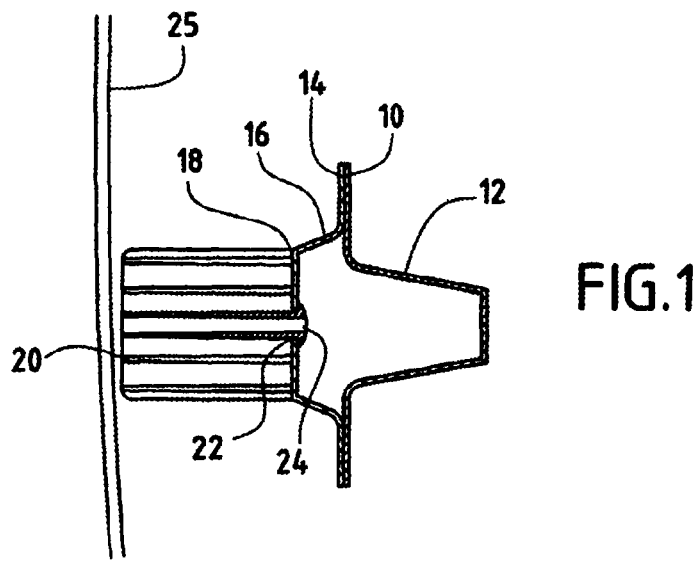
FIG. 1 is a diagrammatic section of an energy-absorbing device produced using an injection-moulded part according to the invention and comprising two hollow energy-absorbing elements and a spacer, the cutting plane passing through the axis of alignment of those three elements.

During the fitting of the absorbing device according to the invention in a motor vehicle, the motor vehicle constructor adds a spacer suited to the space between the inside door panel and the plane of passage of the window inside the door (reference numeral 25 in FIG. 1). Such a spacer bears reference numeral 20 in FIG. 1 and is shown in the form of a ribbed elongated element of almost constant cross-section over its length. Such a spacer element 20 must be fixed to the absorbing device. In the embodiment shown in FIG. 1, the spacer elements 20 are mounted on a plate portion 18. When the plate portion 18 is adjacent to the second hollow impact-absorbing elements 16, circular shafts projecting from the spacer elements 20 enter holes 22 in the second hollow impact-absorbing elements, and deformation of the ends of the shafts by heating causes the formation of heads 24, which connect each spacer element 20 to a hollow impact-absorbing element 16.

Figure 3:
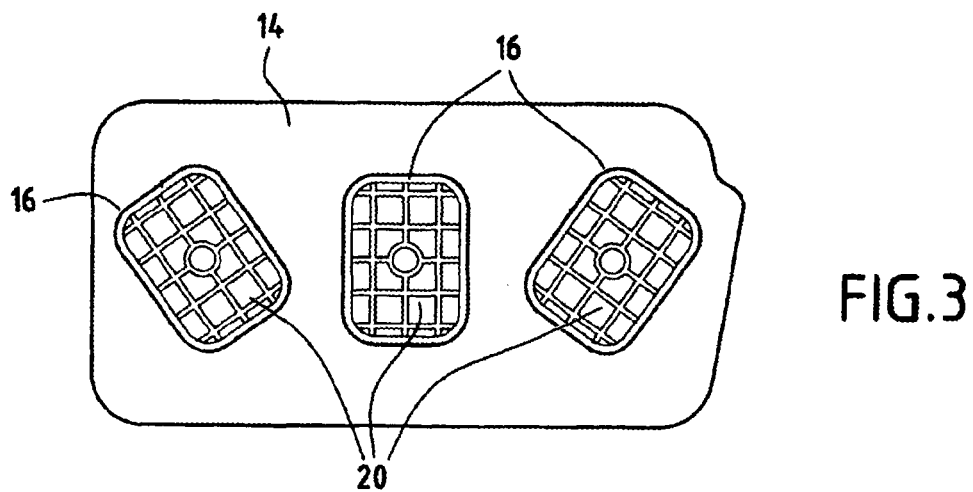
FIG. 3 is a side view of the other side of the impact-energy-absorbing device with a spacer shown in FIG. 2.

FIG. 3 shows that a spacer element 20 is arranged for each hollow impact-absorbing element 16 on the side that is to be turned towards the outside of the motor vehicle.

Figure 4:
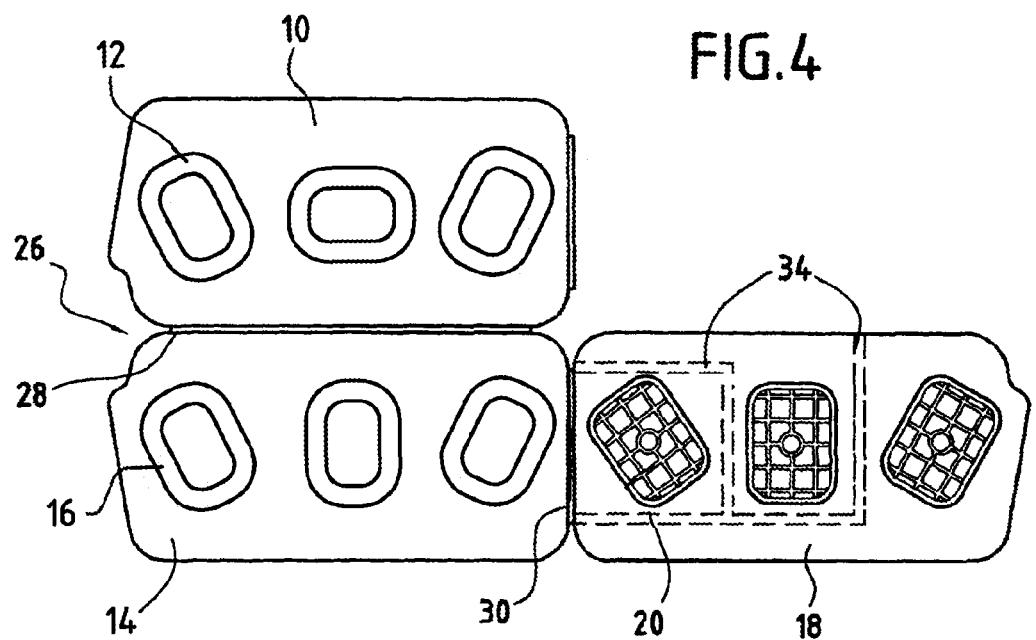
FIG. 4 is a plan view of the injection-moulded part produced according to the invention for the manufacture of the impact-energy-absorbing assembly with a spacer of FIGS. 1 to 3.

FIG. 4 shows an example of an injection-moulded part forming all the hollow impact-absorbing elements and the spacer elements.

Accordingly, the injection-moulded part 26 comprises a first plate portion 10 carrying the hollow elements 12, a second plate portion 14 carrying the hollow elements 16, and a third plate portion 18 carrying the spacer elements 20. The first and second plate portions 10, 14 are articulated about a hinge 28 formed by thinning of the plate portions. Likewise, the plate portion 18 carrying the spacer elements is articulated with the second plate portion 14 about a hinge 30.

Figure 5:
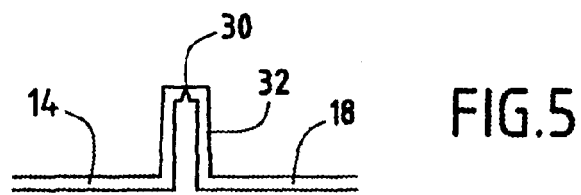
FIG. 5 is an enlargement of a detail of the part of FIG. 4.

FIG. 5 shows that the hinge 30 is formed between two flanges 32. The height of each flange 32 is equal to half the height of the second impact-absorbing elements 16, as shown in FIG. 1. In that manner, the plate portion 18 presses the spacer elements 20 against the bottom of the hollow elements 16.

In the embodiment described hereinbefore, the two plate portions 10 and 14 are in contact and form a plane that is resistant in the direction parallel to the plane of the door. Likewise, the plate portion 18 carrying the spacer elements also forms a part that is resistant to forces in a plane parallel to that of the door. In some embodiments, it is desirable that the second hollow impact-absorbing elements 16 should not be so held between continuous planes formed by the two plate portions 10, 14 on the one hand and by the plate 18 on the other hand, but should be able to work independently. In that case, either plate portions 18 arranged between the spacer elements are removed after the energy-absorbing device has been produced, or the plate 18 is produced with spaces which isolate the spacer elements 20 from one another, so that they are able to exhibit mutual displacement in the plane of the plate portion 18. Accordingly, spaces 34 which can be left in the plate portion 18 have been shown by broken lines in FIG. 4. It is then possible to produce the injection-moulded part in a single operation while obtaining a certain degree of independence of the spacer elements, which allows the second hollow energy-absorbing elements 16 to act relatively independently in the case of a side impact.

In an exemplary embodiment, the injection-moulded part is made of polypropylene. The assembly that is formed has a width of from 200 to 400 mm, a height of from 100 to 250 mm and a thickness of from 50 to 150 mm. The plate portions and the ribs of the spacer elements have a thickness of approximately 2.5 mm, and the hollow elements 12 and 16 have a thickness of the order of from 1.5 to 2 mm.

The invention claimed is:

1. An injection-moulded part comprising:
   an energy-absorbing device, having a plurality of hollow impact-absorbing elements (12) projecting from a first plate portion (10) and a plurality of hollow impact-absorbing elements (16) projecting from a second plate portion (14), the impact-absorbing elements (12, 16) of the two plates portions being associated with each other in pairs; and
   a spacer comprising a plurality of spacer elements (20) projecting from a third plate portion (18), one of the first, second and third plate portions (10, 14, 18) being articulable with the other two of the first, second and third plate portions (10, 14, 18) via hinges (28, 30), the hinges (28, 30) being so arranged that, in a folded mode after each of the plate portions has been rotated through 180° about the hinges, a hollow impact-absorbing element (12) of the first plate portion, a hollow impact-absorbing element (16) of the second plate portion and a spacer element (20) are aligned in a direction perpendicular to a plane of the first, second, and third plate portions.

2. The injection-moulded part according to claim 1,
   wherein a bottom of the hollow impact-absorbing element (16) of the second plate portion (14) carries a first fixing device (22), and
   wherein the spacer element (20) carries a second fixing device, adapted to cooperate with the first fixing device of the hollow impact-absorbing element of the second plate portion (14) carrying the first fixing device (22) and adjacent to the spacer element (20).

3. The injection-moulded part according to claim 1,
   wherein the hollow impact-absorbing elements (12) projecting from the first plate portion (10) have a shape elongated in a direction parallel to the plane of the first plate portion (10), wherein the hollow impact-absorbing elements (16) projecting from the second plate portion (14) have a shape elongated in a direction parallel to the plane of the second plate portion (14), and wherein, when the first and second plate portions (10, 14) are side by side in a principal plane of the injection-moulded part (26), the directions of elongation of the hollow impact-absorbing elements (12) of the first plate portion and of corresponding hollow impact-absorbing elements (16) of the second plate portion facing the hollow impact-absorbing elements (12) in the folded mode are coincident so that, in the folded mode, the directions of elongation of the hollow impact-absorbing elements (12) and the corresponding hollow impact-absorbing elements are perpendicular.

4. The injection-moulded part according to claim 1, wherein each spacer element (20) comprises a plurality of intersecting ribs, a direction of elongation of the ribs being perpendicular to a direction of the plane of the plate portions.

5. An energy-absorbing assembly, comprising:
a spacer, formed from an injection-moulded part according to claim 1,
wherein each spacer element (20) is pressed against and fixed to a bottom of one of the hollow impact-absorbing elements (16) of the second plate portion.

6. The assembly according to claim 5, wherein the first and second plate portions (10, 14) carrying the hollow impact-absorbing elements (12, 16) are in contact.

7. A method for producing an energy-absorbing device for a motor vehicle door from the injection-moulded parts according to claim 1, comprising:
folding the third plate portion (18) towards the second plate portion (14) about a first hinge such that the hollow impact-absorbing elements (16) of the second plate portion (14) are brought adjacent to the spacer elements (20) of the third plate portion (18); after said folding step, fixing the spacer elements (20) of the third plate portion (18) to the hollow impact-absorbing elements (16) of the second plate portion (14); and
after said fixing step, positioning the first plate portion (10) with respect to a second hinge so that the first plate portion (10) becomes adjacent to the second plate portion (14).

8. The method according to claim 7, wherein the fixing of the spacer elements (20) to the hollow impact-absorbing elements (16) comprises the sub-step of forming a head (24) for fixing the hollow impact-absorbing element (16) to the spacer element (20).

9. The injection-moulded part according to claim 2,
wherein the hollow impact-absorbing elements (12) projecting from the first plate portion (10) have a shape elongated in a direction parallel to the plane of the first plate portion (10),
wherein the hollow impact-absorbing elements (16) projecting from the second plate portion (14) have a shape elongated in a direction parallel to the plane of the second plate portion (14), and
wherein, when the first and second plate portions (10, 14) are side by side in a principal plane of the injection-moulded part (26), the directions of elongation of one hollow impact-absorbing element (12) of the first plate portion and of a corresponding hollow impact-absorbing element (16) that faces the one hollow impact-absorbing element (12) in the folded mode are coincident so that, in the folded mode, the directions of elongation of the one hollow impact-absorbing element (12) and the corresponding hollow impact-absorbing element are perpendicular.

10. The injection-moulded part according to claim 3, wherein each spacer element (20) comprises a plurality of intersecting ribs, a direction of elongation of the ribs being perpendicular to a direction of the plane of the plate portions.

11. An energy-absorbing assembly, comprising:
a spacer, formed from an injection-moulded part according to claim 2,
wherein each spacer element (20) is pressed against and fixed to a bottom of one of the hollow impact-absorbing elements (16) of the second plate portion.

12. An energy-absorbing assembly, comprising:
a spacer, formed from an injection-moulded part according to claim 3,
wherein each spacer element (20) is pressed against and fixed to a bottom of one of the hollow impact-absorbing elements (16) of the second plate portion.

13. An energy-absorbing assembly, comprising:
a spacer, formed from an injection-moulded part according to claim 4,
wherein each spacer element (20) is pressed against and fixed to a bottom of one of the hollow impact-absorbing elements (16) of the second plate portion.

14. The injection-moulded part according to claim 2, wherein the first fixing device (22) is a shaft and the second fixing device is a hole.

15. The injection-moulded part according to claim 2, wherein the first fixing device (22) is a hole and the second fixing device is a shaft.

16. The injection-moulded part according to claim 1,
wherein each of the first, second and third plate portions are connected and articulable with another of the first, second, and third plate portions via the hinges, and
wherein, in the folded mode, the plate portions are brought to be in contact with each other.

17. An injection-moulded part comprising:
an energy-absorbing device, having a plurality of hollow impact-absorbing elements (12) projecting from a first plate portion (10) and a plurality of hollow impact-absorbing elements (16) projecting from a second plate portion (14), the impact-absorbing elements (12, 16) of the two plates portions being associated with each other in pairs; and
a spacer comprising a plurality of spacer elements (20) projecting from a third plate portion (18), one of the first, second and third plate portions (10, 14, 18) being articulable with the other two of the first, second and third plate portions (10, 14, 18) via hinges (28, 30), the hinges (28, 30) being so arranged that, in a folded mode after each of the plate portions has been rotated through 180° about the hinges, a hollow impact-absorbing element (12) of the first plate portion, a hollow impact-absorbing element (16) of the second plate portion and a spacer element (20) are aligned in a direction perpendicular to a plane of the first, second, and third plate portions,
wherein each spacer element (20) comprises a plurality of intersecting ribs, a direction of elongation of the ribs being perpendicular to a direction of the plane of the plate portions.

* * * * *